May 27, 1924.
B. O. AUSTIN ET AL
1,495,764
DYNAMIC BRAKING
Filed Aug. 18, 1921
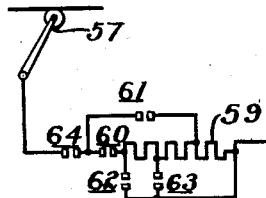
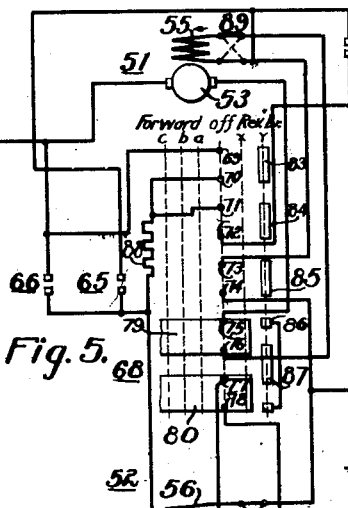
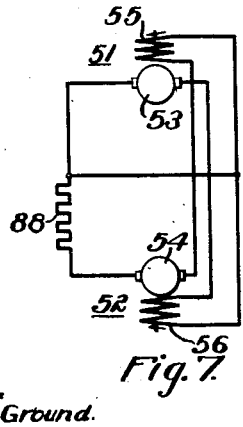
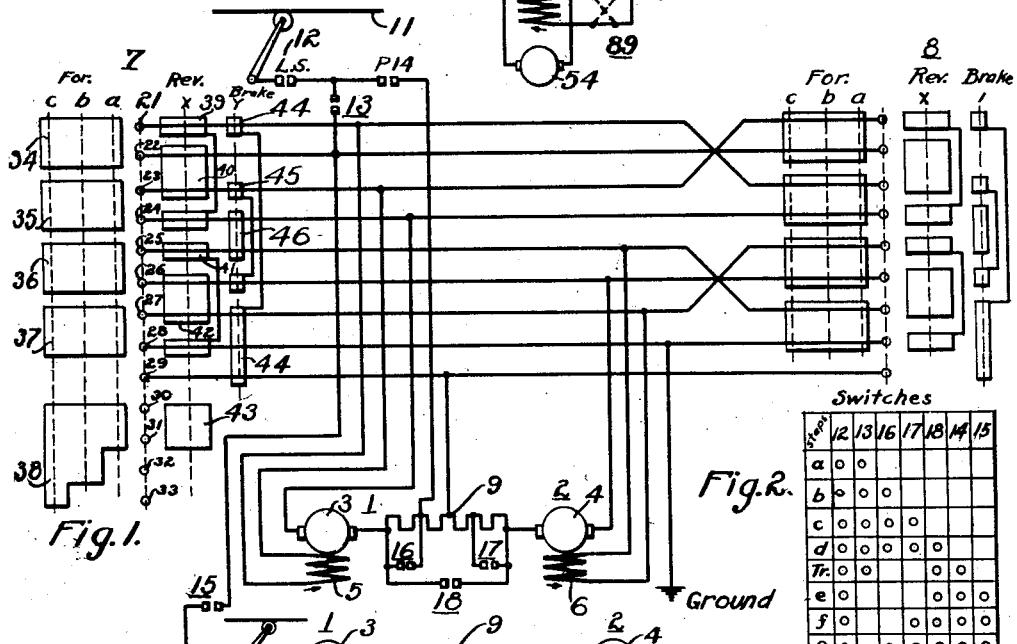
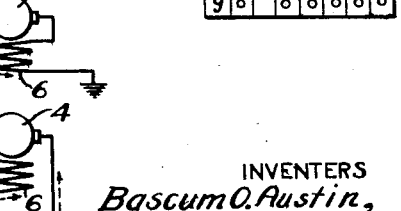
INVENTERS
Bascum O. Austin,
William M. Hutchison
and Harry R. Meyer.
BY
Wesley G. Carr
ATTORNEY
WITNESSES:
L. F. Sonnemann.
H. C. Lowe Patented May 27, 1924.

1,495,764

UNITED STATES PATENT OFFICE.

BASCUM O. AUSTIN, WILLIAM M. HUTCHISON, AND HARRY R. MEYER, OF WILKINSBURG, PENNSYLVANIA, ASSIGNORS TO WESTINGHOUSE ELECTRIC & MANUFACTURING COMPANY, A CORPORATION OF PENNSYLVANIA.

DYNAMIC BRAKING.

Application filed August 18, 1921. Serial No. 493,326.

*To all whom it may concern:*

Be it known that we, BASCUM O. AUSTIN, a citizen of the United States, and a resident of Wilkinsburg, in the county of Allegheny and State of Pennsylvania, WILLIAM M. HUTCHISON, a citizen of the United States, and a resident of Wilkinsburg, in the county of Allegheny and State of Pennsylvania, and HARRY R. MEYER, a citizen of the United States, and a resident of Wilkinsburg, in the county of Allegheny and State of Pennsylvania, have invented a new and useful Improvement in Dynamic Braking, of which the following is a specification.

Our invention relates to motor-control systems and it has particular relation to systems employed to govern the operation of motor-driven vehicles.

One object of our invention is to provide an improved method of dynamic braking for railway motors.

Another object of our invention is to provide a control system, for a plurality of motors that are mounted upon a car, which will effect dynamic braking by a single movement of the controller handle at either end of the car, regardless of the direction of operation thereof.

Another object of our invention is to provide a control system for a plurality of motors whereby dynamic braking may be readily effected, although maintaining the current traversing the motors at a value that will not impair the control system.

Heretofore, various systems of control have been proposed for effecting dynamic braking of a plurality of vehicle motors. However, a number of manual operations by the operator were required before it was possible to effect dynamic braking. Usually, the controller had to be thrown to the "Off" position and then the reverser actuated to change the relation of the field-magnet windings of the motors to their respective armatures.

A further difficulty was encountered, when a vehicle was ascending a grade, that, after dynamic braking has been effected and the car brought to a stop, movement of the car in a reverse direction would be effected by gravity. As the series field-magnet windings had been previously connected to their respective motor armatures to effect "forward" dynamic braking, the voltage would not build up when the motors operated in a reverse direction, unless the relation of the field-magnet windings to the armatures was again changed. This change required re-operating the reverser.

Briefly speaking, our invention consists in connecting the armatures of the motors to the series field-magnet windings of other motors to form a plurality of dynamic braking circuits having at least one portion of one circuit common to that of another circuit, and inserting a resistor in at least one of the dynamic-braking circuits to permit the voltage of the motors to build up.

For a better understanding of our invention, reference may be made to the accompanying drawing.

Figure 1 of which is a schematic view of a control system embodying our invention;

Fig. 2 is a sequence chart showing the preferred order of closure of a plurality of switches that are employed to govern the control system shown in Fig. 1;

Figs. 3 and 4 are simplified diagrams illustrating the method of connecting the motors shown in Fig. 1 during normal operation of the motors and during dynamic braking, respectively;

Fig. 5 is a schematic view of a portion of another form of control system in which our invention is employed;

Fig. 6 is a sequence chart illustrating the preferred order of closure of the switches that are shown in Fig. 5; and Fig. 7 is a simplified diagram illustrating the manner in which the motors that are shown in Fig. 5 are connected during dynamic braking.

Referring particularly to Fig. 1, a plurality of motors 1 and 2 are provided with armatures 3 and 4, respectively, and corresponding series field-magnet windings 5 and 6. The motors 1 and 2 may be governed by controllers 7 and 8, which are mounted upon the front and the rear of the car, respectively. The starting resistor 9 is employed during acceleration of the motors 1 and 2 and also during dynamic braking to reduce the current traversing the armature circuits.

The motors 1 and 2 are energized from a source of electrical energy, such, for example, as trolley 11 and a return circuit marked Ground. The control system is provided with a line switch or circuit-breaker 12, a series contactor 13 and parallel-connecting contactors 14 and 15, which will be hereinafter referred to as the parallel and the Ground contactor, respectively. A plurality of accelerating contactors 16, 17 and 18 are provided for shunting the starting resistor 9.

Each of the controllers 7 and 8 is provided with a plurality of "forward" operating positions a, b and c, a "reverse" operating position x and a dynamic-braking position y.

Each of the controllers 7 and 8 is further provided with a plurality of control fingers 21 to 33, inclusive, which may be engaged by the forward contact segments 34 to 38, inclusive, reverse contact segments 39 to 43, inclusive, and dynamic-braking contact segments 44 to 46, inclusive.

If the operation of the vehicle is begun by actuating the master controller 7 to position a, a plurality of auxiliary circuits are established through control fingers 30 and 31, which are bridged by the contact segment 38, and the actuating coils of the line switch 12 and the series contactor 13. These circuits have not been shown, as they are well understood in the art and are not relevant to our invention.

Upon the closure of the line switch 12 and series contactor 13, a main circuit is established from the trolley 11 through the line switch 12, series contactor 13, control fingers 22 and 21, which are bridged by contact segment 34, series field-magnet winding 5 of the motor 1, control fingers 23 and 24, which are bridged by contact segment 35, armature 3 of the motor 1, starting resistor 9, armature 4 of the motor 2, control fingers 26 and 25, which are bridged by contact segment 36, series field-magnet winding 6 of the motor 2 and control fingers 27 and 28, which are bridged by contact segments 37 and 38, to Ground. In position a, the motors 1 and 2 are thus connected in series relation, with the starting resistor 9 in circuit therewith, as is illustrated in a simplified manner in Fig. 3 of the drawing.

The motors 1 and 2 are accelerated by actuating controller 7 to position b, thereby establishing a plurality of circuits through the control finger 32 and contact segment 38 and the actuating coils of the accelerating contactors 16, 17 and 18, which are provided with interlocks of a familiar type to effect their closure in the order shown by positions b, c and d of the sequence chart. When the accelerating contactor 18 has closed, the motors 1 and 2 are connected in series relation, with the starting resistor 9 completely shunted.

When the controller 7 is actuated to position c, the control finger 33 is energized by contact segment 38 to effect closure of the parallel-connecting contactors 14 and 15 and, by means of interlocks, the opening of series contactor 13 and accelerating contactors 16 and 17, in accordance with position e of the sequence chart. The motors 1 and 2 are thus connected in parallel relation by a circuit from trolley 11, through line switch 12, parallel contactor 14, a portion of the starting resistor 9, armature 3 of the motor 1, control fingers 24 and 23, which are bridged by contact segment 35 of the controller 7, series field-magnet winding 5 of the motor 1, control fingers 21 and 22, which are bridged by contact segment 34 of the controller 7, and Ground contactor 15, to Ground, and a parallel circuit from line switch 12, through parallel-connecting contactor 14, a portion of the starting resistor 9, accelerating contactor 18, armature 4 of the motor 2, control fingers 25 and 26, which are bridged by contact segment 36 of the controller 7, series field-magnet winding 6 and control fingers 27 and 28, which are bridged by the contact segment 37, to Ground.

The motors 1 and 2 may be further accelerated by the closure of the resistor-shunting contactors 17 and 16, in accordance with positions f and g of the sequence chart of Fig. 2.

If it is desired to stop the car by means of dynamic braking, the master controller 7 is actuated to its dynamic braking position y, thereby opening up the line switch 12 and contactors 13 to 18, inclusive.

When the controller 7 occupies position y, a dynamic-braking circuit is established from one terminal of armature 4 of the motor 2, through a portion of the starting resistor 9, control fingers 29 and 21, which are bridged by the contact segment 44 of the controller 7, series field-magnet winding 5 of the motor 1 and control fingers 23 and 26, which are bridged by the contact segment 45, to the other terminal of armature 4.

A second dynamic-braking circuit is also established from one terminal of armature 3 of the motor 1 through a portion of the starting resistor 9, control fingers 29 and 27, series field-magnet winding 6 of the motor 2 and control fingers 25 and 24, which are bridged by contact segment 46 of the controller 7, to the other terminal of armature 3. The above-described dynamic-braking circuits are illustrated in Fig. 4 of the drawing.

By cross-connecting the field windings 5 and 6 of the motors 1 and 2 with respect to the armatures 4 and 3, the braking voltage is permitted to build up. The starting resistor 9 serves to prevent too great a dynamic-braking current traversing the armature circuits. The resistor 9 and the cross-connected field windings also prevent the one motor from operating as a generator and the other as a motor during dynamic braking. For example, if the magnetization of the series field-magnet winding 5 is greater than that of the series field-magnet winding 6, the armature 3 of the motor 1 will, for the instant, produce the greater dynamic-braking current, thereby increasing the energization of the series field-magnet winding 6 and thus increasing the dynamic-braking action of the motor 2. In this way, a balanced dynamic-braking action is maintained at all times.

The motors 1 and 2 may be operated in a reverse accelerating direction by actuating the controller 7 to its reverse position, thereby effecting closure of line switch 12 and series contactor 13 by a plurality of auxiliary circuits comprising the actuating coils thereof and control fingers 30 and 31, which are bridged by contact segment 43.

Upon closure of the line switch 12 and series contactor 13, a main circuit is established from the trolley 11 through the line switch 12, series contactor 13, control fingers 22 and 23, which are bridged by contact segment 40 of the controller 7, series field-magnet winding 5 of the motor 1, control fingers 21 and 24, which are bridged by contact segment 39, armature 3 of the motor 1, starting resistor 9, armature 4 of the motor 2, control fingers 26 and 27, which are bridged by contact segment 42 of the controller 7, series field-magnet winding 6 of the motor 2 and control fingers 25 and 28, which are bridged by the contact segment 41 of the controller 7, to Ground.

The motors 1 and 2 are now connected in series relation, with the starting resistor 9 in circuit therewith in the same manner as during forward operation at the lowest speed, with the exception, however, that the series field-magnet windings 5 and 6 of the motors 1 and 2, respectively, have their terminals connected in different relation to the corresponding armatures 3 and 4.

Dynamic braking is effected in the same manner as during forward operation of the motors 1 and 2; that is, by actuating the controller 7 to its dynamic-braking position, thereby establishing the same dynamic-braking circuits as have previously been described and which are illustrated in Fig. 4, with this exception, however: the direction of the magnetization of the field-magnet windings 5 and 6 of the motors 1 and 2 being different from that for forward operation, the current traversing armatures 3 and 4 of the motors 1 and 2, respectively, is in the opposite direction to that previously described for dynamic braking during forward operation.

If the motors 1 and 2 are brought to a stop by dynamic braking and are then driven in a reverse direction by the car on which they are mounted moving down-hill, dynamic braking of the motors 1 and 2 is automatically effected, as set forth below.

If the armatures 3 and 4 of the motors 1 and 2, respectively, are rotated in a reverse direction and if the field-magnet winding 5 of the motor 1 is magnetized the stronger, current from the armature 3 of the motor 1 traverses the series field-magnet winding 6 of the motor 2 and a portion of the starting resistor 9 in a direction shown by the dotted-line arrows. If the direction of rotation of the armature 4 and the direction of magnetization of the series field-magnet winding 6 have both been changed to the opposite directions, the current traversing the armature 4 of the motor 2 will be in the same direction as before, thereby tending to further increase the magnetization of the series field-magnet winding 5 and thus build up the voltage of both machines. This method of effecting dynamic braking is of considerable advantage where the electric vehicles operate in relatively hilly country.

Referring to Figs. 5, 6 and 7 of the drawing, motors 51 and 52, having armatures 53 and 54, respectively, and corresponding field-magnet windings 55 and 56, are energized from a source of electrical energy, such, for example, as a trolley 57 and a return circuit marked "Ground."

A starting resistor 59, in circuit with the motors 51 and 52, may be shunted by a plurality of accelerating contactors 60 to 63, inclusive. A line switch 64 is employed for connecting the motors 51 and 52 to trolley 57. Series contactor 65 and parallel-connecting contactors 66 and 67 are employed for connecting the motors 51 and 52 in series and in parallel relation, respectively.

The main controller 68, only a portion of which is shown, has a plurality of forward operating positions $a$ to $i$, inclusive, only the first three positions of which are shown, a reverse position $x$ and a dynamic-braking position $y$. The main controller 68 is actuated by an auxiliary motor or an electro-pneumatic engine (not illustrated), the operation of which is controlled from both the forward and rear platforms, in a manner well known to the art.

The main controller 68 is provided with a plurality of control fingers, only those from 69 to 78 being shown. A plurality of contact segments 79 and 80, which engage the pairs of control fingers 75 and 76 and 77 and 78, respectively, are employed during forward and reverse operation for assisting to maintain certain main circuits, which will hereinafter be described.

A plurality of contact segments 83 to 87, inclusive, are mounted upon the main controller 68 to engage the control fingers 69 to 78, inclusive, during dynamic braking in a manner hereinafter set forth. A braking resistor 88 is provided for reducing the current traversing the motors 51 and 52 during dynamic braking. A reverser 89, which is illustrated diagrammatically, is controlled from the forward and the rear platforms by master reversers, which are not shown.

When the master controller (not shown) has been actuated to the first position, the main controller 68 is actuated to position $a$, thereby effecting the energization of the actuating coils of the line switch 64, series contactor 65 and accelerating contactor 60, to establish a circuit from trolley 57, through line switch 64, accelerating contactor 60, resistor 59, armature 53 of the motor 51, control fingers 75 and 76, which are bridged by contact segment 79 of the main controller 68, main reverser 89, series field-magnet winding 55 of the motor 51, series contactor 65, armature 54 of the motor 52, control fingers 77 and 78, which are bridged by contact segment 80 of the main controller 68, main reverser 89 and series field-magnet winding 56 to Ground.

When the above circuit is established, the motors 51 and 52 are connected in series relation one with another, and the full starting resistor 59 is in circuit therewith.

The motors 51 and 52 are accelerated by actuating the main controller 68 through positions $b$, $c$ and $d$, to position $e$, thereby effecting closure of the accelerating contactors 61, 62, 63 and 60, in accordance with positions $b$ to $e$, inclusive, of the sequence chart, shown in Fig. 6. In position $e$, the starting resistor 59 is completely shunted and the motors 51 and 52 are connected in series relation, directly across the supply circuit.

The motors may be further accelerated by actuating the main controller 68 to its first parallel position, $f$, thereby energizing the actuating coils of the parallel-connecting contactors 66 and 67 and de-energizing the actuating coils of the series contactor 65 and accelerating contactor 60, in accordance with position $f$ of the sequence chart.

Upon the closure of the parallel-connecting contactors 66 and 67, a circuit is established from trolley 57 through line switch 64, accelerating contactor 61, starting resistor 59, accelerating contactor 62, armature 53 of the motor 51, control fingers 75 and 76, which are bridged by contact segment 79 of the main controller 68, main reverser 89, series field-magnet winding 55 of the motor 51 and parallel-connecting contactor 67 to Ground, while a second circuit is established from line switch 64 through accelerating contactor 61, starting resistor 59, accelerating contactor 62, parallel-connecting contactor 66, armature 54 of the motor 52, control fingers 77 and 78, which are bridged by contact segment 80, main reverser 89 and series field-magnet winding 56 to Ground.

The motors 51 and 52 are now operating in parallel relation, with portions of the starting resistor 59 in series therewith. The motors are further accelerated upon closure of the accelerating contactors 63, 60 and 62, in accordance with the positions $g$, $h$ and $i$ of the sequence chart.

The motors 51 and 52 may be operated in a reverse direction by actuating the main reverser 89 to its reverse position to effect reversal of the connections of the series field-magnet windings 55 and 56 of the motors 51 and 52, respectively, to the corresponding armatures 53 and 54. The motors 1 and 2 are connected in the same manner as for forward operation, when the controller 68 occupies position $a$, except that the field-magnet windings have their terminal connections reversed.

To effect dynamic braking of the motors 51 and 52, a master controller (not shown) is actuated to its dynamic-braking position to thereby effect movement of the main controller 68 to its dynamic-braking position $y$, illustrated in the drawing.

When the main controller 68 has been actuated to position $y$, line switch 64, accelerating contactors 60 to 62, inclusive, series contactor 65 and parallel-connecting contactors 66 and 67 assume their open positions, since their actuating coils are not energized. As all the main switches are open during dynamic braking, it is considered unnecessary to show any more of the main controller 68 than is illustrated in the drawing, since dynamic-braking circuits are established without the aid of any of the accelerating, series or parallel-connecting contactors.

When the main controller 68 has been actuated to position $y$, dynamic-braking circuits are formed by cross-connecting the series field-magnet windings 55 and 56 of the motors 51 and 52, respectively, with respect to the series field-magnet windings 56 and 55 of the opposite machines and a resistor 88 is connected in one of these circuits, thereby permitting the voltage of the motors 51 and 52 to build up.

One of the dynamic-braking circuits is established from one terminal of the armature 54 of the motor 52, through control fingers 77 and 76, which are bridged by contact segment 87, main reverser 89, series field-magnet winding 55, control fingers 73 and 74, which are bridged by contact segment 85, control fingers 72 and 71, which are bridged by contact segment 84, and dynamic-braking resistor 88, to the armature 54 of the motor 52.

The other dynamic-braking circuit is from the armature 53 of the motor 51, through control fingers 75 and 78, which are bridged by contact segment 86 of the main controller 68, main reverser 89, series field-magnet winding 56, control fingers 72 and 71, which are bridged by the contact segment 84, and control fingers 70 and 69, which are bridged by the contact segment 83 of the main controller 68, to the other terminal of the armature 53.

These dynamic braking circuits are illustrated by the simplified diagram of Fig. 7.

As the dynamic-braking circuits are substantially the same as those shown in Fig. 4, it is, of course, apparent that, if the direction of operation of the motors 51 and 52 is reversed by the car rolling backward, dynamic braking will be effected in the same manner, as is described for the motors 1 and 2 under the same conditions, except that the resistor 88 is not in series relation with the armature 53 and the field-magnet winding 56.

From the above description it is apparent that we have provided a system of dynamic braking for a plurality of motors which makes it unnecessary to perform more than one manual operation to effect dynamic braking and that provides dynamic braking regardless of the direction of operation of the motor or at which end of the car, a controller is actuated.

While we have shown our invention in a preferred form, it is apparent that minor modifications may be made in the arrangement of circuits without departing from the spirit of our invention. We desire, therefore, to be limited only by the scope of the appended claims.

We claim as our invention:

1. In a control system, the combination with a plurality of dynamo-electric machines, of a plurality of switches for connecting said machines in different relations one with another, a controller having an "Off" position and a dynamic-braking position, and means comprising said controller for effecting unequal dynamic braking circuits for said machines solely by actuating said controller to its dynamic-braking position.

2. In a control system, the combination with a plurality of dynamo-electric machines, of means for connecting said machines in different relations, means for reversing the direction of operation of said machines, a plurality of controllers, each having an "Off" position and a plurality of operating positions for governing the operation of said connecting means and said reversing means, and means governed by said controllers for effecting unequal electrical braking circuits for said machines upon any one of said controllers being actuated to its dynamic-braking position.

3. In a control system, the combination with a plurality of dynamo-electric machines, each of said machines having an armature and a field-magnet winding, of means for connecting said armatures to the field-magnet winding of a different machine and a resistor adapted to be inserted in only one of said armature circuits.

4. In a control system, the combination with a plurality of motors, each of said motors having an armature and a series field-magnet winding, of a resistor, means for connecting said resistor to an armature of one machine and the winding of another machine to form a dynamic-braking circuit and means for connecting the remaining armature and winding only in another dynamic-braking circuit.

In testimony whereof, we have hereunto subscribed our names this first day of August, 1921.

BASCUM O. AUSTIN.
WILLIAM M. HUTCHISON.
HARRY R. MEYER.